United States Patent [19]

Thomas

[11] Patent Number: 5,587,646
[45] Date of Patent: Dec. 24, 1996

[54] RECHARGEABLE TABLE LIGHTING SYSTEM WITH PROTECTION FROM SHORT CIRCUITS

[76] Inventor: Mark S. Thomas, 5058 Dunsmuir Common, Fremont, Calif. 94555

[21] Appl. No.: 311,269

[22] Filed: Sep. 23, 1994

[51] Int. Cl.$^6$ .................................. F21L 7/00; H02J 7/00
[52] U.S. Cl. .................................. 320/25; 320/2; 320/48; 361/82; 362/183
[58] Field of Search .................................. 320/48, 25, 2; 324/426; 362/20, 183, 161; 361/82, 84

[56] References Cited

U.S. PATENT DOCUMENTS

| | | | |
|---|---|---|---|
| 4,691,157 | 9/1987 | McDermott | 320/2 |
| 4,764,853 | 8/1988 | Thomas et al. | 362/183 |
| 4,991,069 | 2/1991 | Tiller | 362/183 |
| 5,482,793 | 1/1996 | Burnes et al. | 429/62 |

OTHER PUBLICATIONS

Horenstein, Mark, N., "Microelectronic Circuit and Devices", pp. 129–130.

*Primary Examiner*—Peter S. Wong
*Assistant Examiner*—Gregory J. Toatley, Jr.

[57] ABSTRACT

Rechargeable battery packs for table lighting each contain a 3-element phono jack in their base for engaging a battery recharger phono plug the insertion of which opens the lamp circuit. If a phono plug has short circuited elements, its insertion into a battery pack causes a short circuit of the battery resulting in damage or destruction of the pack. This is prevented by inserting a diode in the circuit to permit current flow in one direction. Also disclosed is a fault locator for locating a shorted plug of many plugs on a charger board.

5 Claims, 2 Drawing Sheets

5,587,646

RECHARGEABLE TABLE LIGHTING SYSTEM WITH PROTECTION FROM SHORT CIRCUITS

This invention relates to electric circuit protection and more particularly to a circuit that prevents damage to small rechargeable batteries and their circuits while in charging mode.

BACKGROUND

The table top lighting market for restaurant, hotel, catering, and other businesses has been normally accomplished by placing a portable renewable light source on the table. The portable renewable light sources generally fall into two broad categories: (1) Fossil fuel based, e.g. candles, paraffin cartridges, etc. (2) Electric battery based, e.g. the system described in U.S. Pat. No. 4,764,853. The electric based system consist of a central battery recharging unit serving a plurality of battery power packs used in cafe table top lighting fixtures.

The system described in U.S. Pat. No. 4,764,853 has power packs which mate to the charger via phono jack/plug arrangement. In a typical restaurant requiring four or five dozen lamps, they are operated continuously for an eight hour shift and later all are recharged by plugging each into one of many phono plugs secured to the surface of a special charger.

The environment and/or the handling of the electric system is often very harsh. The rapid turnover of personnel using the system on a daily basis are often untrained in its use or for other reasons neglect the proper care and maintenance of all equipment. Like any other apparatus an electric table top lighting system can suffer damage from poor handling endemic to the restaurant trade.

OBJECT OF THE INVENTION

The object of this invention is to prevent damage to power packs from the most serious mode of failure of an electric table top lighting systems. Over the course of use of the equipment the electric phono plug that resides on the charger board may be damaged and cause a short between terminals. Specifically though not limited to the system described in U.S. Pat. No. 4,764,853 the phono plug insulating sleeve can fail. The effect of this sort of failure on a power packs is dramatic. Upon insertion of the power pack into the charger board all residual capacity of the batteries is depleted through the short at extremely high current levels. The current levels are of such a magnitude that the wiring internal to the power pack is damaged rendering the power pack inoperable. Also the service personnel will unknowingly burn out a new power pack every day until management becomes aware of the problem. Increasing the gauge of the wire is not a solution since the batteries will be permanently damaged if the large currents are allowed to be sustained as well as possibility of fire if case material is not fire retardent. The use of a wire gauge which is adequate in normal operation of the power pack handles the small current value that is required for lighting; however this wire gauge size also acts as a fuse in the shorting phenomena described herein since shorted surge current can be 200+ times rated operational current. The power pack becomes inoperative as a result of fusing action opening the power pack circuit, but the batteries but are saved but have a shorten working life.

This following invention will prevent the above shorting and allow the user to continue to use the equipment with no damage to any power packs. The only penalty will be that the one power pack mounted to a shorted the pin will not accept a charge, but should remain mounted to the pin to maintain current flow through the balance of power packs in that particular charge circuit. The customer normally has a few extra power packs and is not put into an emergency repair mode nor expense of a number of new replacement power packs.

DESCRIPTION

Figure 1:
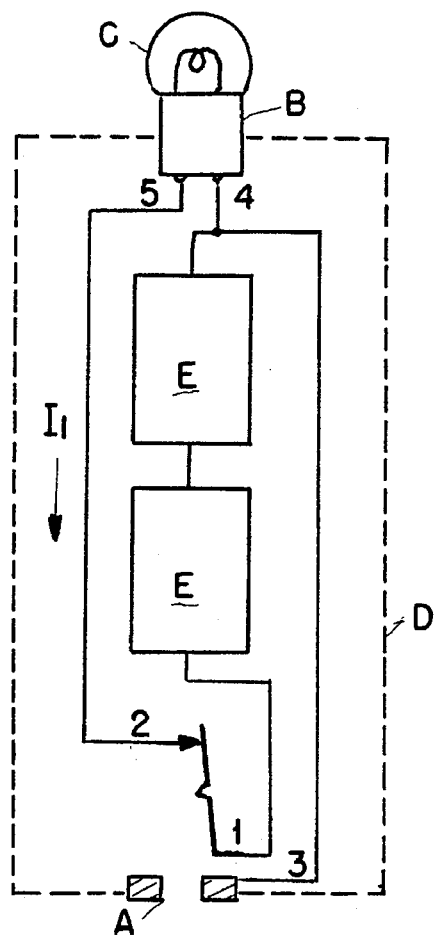
FIG. 1 is a schematic diagram of a power pack of the prior art in the discharge mode.
Figure 2:
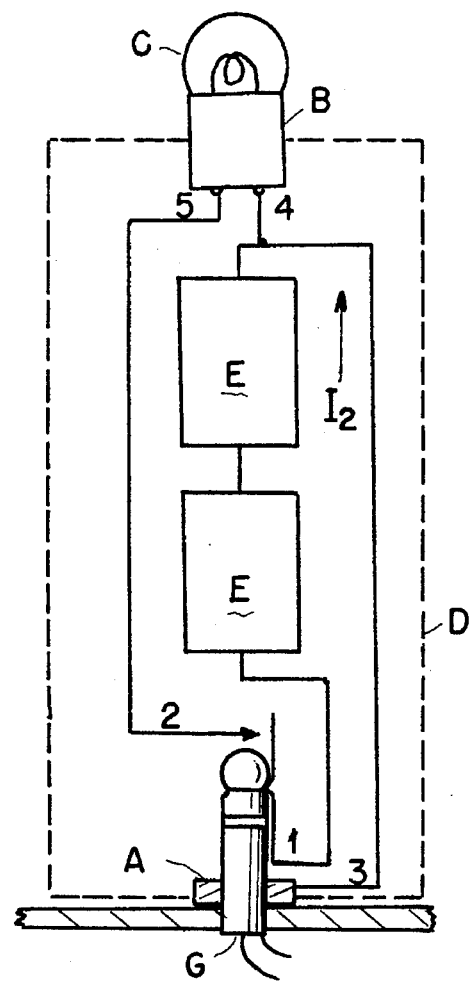
FIG. 2 is a schematic diagram illustrating a power pack of the prior art being charged.

The invention disclosed below relates to the charging and discharging of "power packs". A power pack is defined as a set of rechargeable batteries contained in a single enclosure and configured to supply power to an external load. Per U.S. Pat. No. 4,764,853 power packs may be internally configured utilizing a 3-element, normally closed phono jack A as shown in FIG. 1. Note that there are two separate current paths that may be established. When the power pack is not connected to the charger, i.e. when the phono plug is not mated with the phono jack A, points 1 and 2 are connected within the phono jack. This establishes current I1 in the loop defined by points 2,1,4,5 shown in FIG. 1. When the power pack is connected to the charger, i.e. when the phono plug G as shown in FIG. 2 is inserted into the phono jack, points 1 and 2 are disconnected and instead the tip of the phono plug is connected to point 1 and the ring of the plug G (the part between the insulation ring and the base of the plug) is connected to point 3. The charger establishes current I2 through points 3, 4, and 1 as shown in FIG. 2. Note that the direction of I2 through the batteries is the reverse of the direction of I1, hence I2 will act to recharge the batteries.

Figure 3:
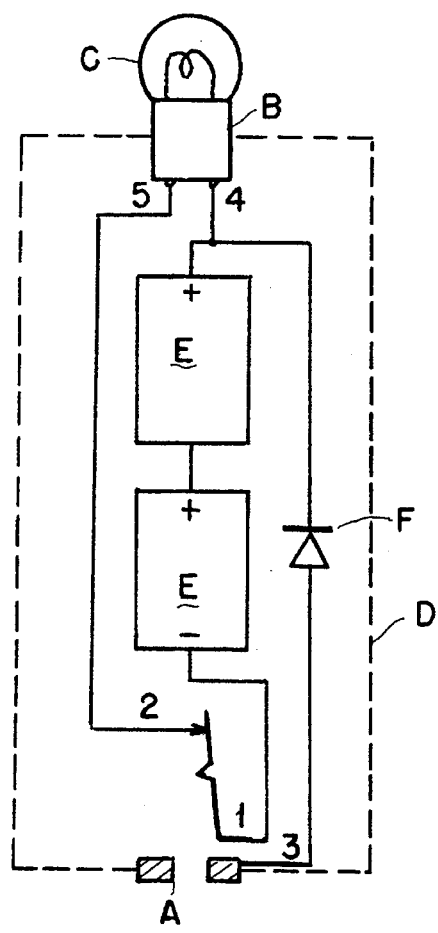
FIG. 3 is a diagram showing the claimed safety circuit in the power pack.

The importance of the idea disclosed herein is seen in the following scenario. Consider the case shown in FIG. 2. Suppose that the tip and the ring of the phono plug G are somehow shorted together (note: this could occur if the insulation ring fails or if the charger experiences a wiring short). In this case the batteries will discharge very rapidly at a very large current. The magnitude of this current is so large that it will cause damage to either the wiring of the power pack or to the batteries or both. This type of problem has been seen in the field many times. Sometimes many power packs are rendered inoperable before the problem is reported to the restaurant manager. The invention disclosed herein is a method for preventing such a problem. Consider FIG. 3. A diode has been placed in between points 3 and 4 such that the current can only flow in the direction that will charge the batteries. If a short between points 1 and 3 occurs then the diode will be back biased and therefore no current will flow. Any diode will serve to provide this protection however it is preferable to use a Schottky diode which has a lower forward voltage drop and therefore requires less charger voltage to overcome it.

Figure 4:
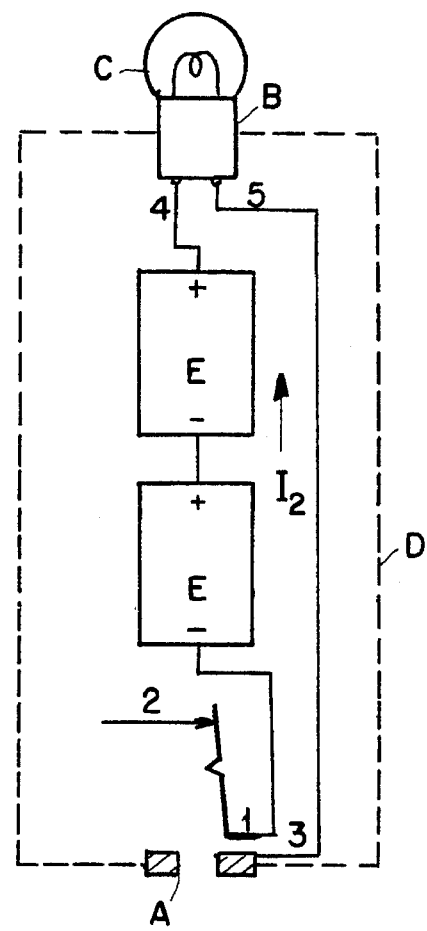
FIG. 4 is a diagram of a modified power pack used for locating the specific shorted plug and/or plugs on the recharging unit.

As noted above the diode prevents damage to the power pack, but it does not locate the offending plug. The new and unique device to locate the specific shorted plug on any charger board utilizing our U.S. Pat. No. 4,764,853 is described as follows:

In normal charging a charger establishes current I2 through points 3,4, and 1 as shown in FIG. 2. We now want to furnish a means of locating the shorted plug with a minimum of parts and labor costs by utilizing the circuitry (see FIG. 4) and the same housing of the existing power packs combined with a charger plug to accomplish this need. If one builds a device which has a current path of 3,5,4,1 of FIG. 4, this will allow pack batteries to be used to light the bulb in a shorted pin situation, and if there is no short the bulb remains unlit. When the power pack is not mounted on a board the circuit shown in FIG. 4 is open since point 2 is disconnected from circuit, therefore will remain unlit. When a power pack is mounted to a charger board plug the circuit will remain open unless there is a short between points 1 and 3, and in this case circuit 1,3,5,4 is complete and the locator will light up thus locating bad pin. Periodic checks with this device are simple and quick. Turning off the charger and checking each charger pin with the locator takes only a few seconds. The locator or a standard power pack can be left on a shorted pin to furnish continuity to group power packs which will continue to charge. In most cases the customer has spare power packs and does not have a major problem with the one to three power pack shortage, but it does allow normal table lighting operations to proceed until routine maintenance is requested by customer. All this without the loss of a single good power pack and/or external damage of any kind.

What is claimed is:

1. A battery operated table lighting fixture including:

a housing having an upper and a lower end, said housing containing a rechargeable battery;

a lamp extending from the upper end of the housing;

a 3-element, normally closed phono jack in the lower end of said housing opposite said lamp, said phono jack having an electrically conductive body element, a resilient conductive tip element and a conductive third element normally in contact with said conductive tip element;

first series circuitry including said battery, said lamp, said conductive tip element and said conductive third element for energizing said lamp from said battery; and second series circuitry including said electrically conductive body of said jack, said battery, and said conductive tip element, said first series circuit being opened upon the insertion of a phono plug from a battery charger into said jack;

the improvement comprising a diode in said second series circuitry between said conductive body of said jack and said battery, the cathode end of said diode being attached to a positive terminal of said battery for preventing rapid discharge of said battery by the insertion into said jack of a phono plug with short circuited body and tip contacts.

2. The table lighting fixture claimed in claim 1 wherein said first series circuitry passes current in a first direction from a positive terminal of said battery through said lamp and through said jack elements to the negative terminal of said battery.

3. The table lighting fixture claimed in claim 2 wherein said second series circuitry passes current is a second direction opposite to said first direction from said jack, through said diode to the positive terminal of said battery and through said battery to said jack.

4. The table lighting fixture claimed in claim 1 wherein said diode is a Schottky diode.

5. A unit for testing a phono plug to determine if a short circuit occurs between the tip contact and body contact upon insertion of said plug into a phono jack, said unit omrising:

a lamp extending from a housing containing a battery;

a phono jack in said housing, said jack having a conductive body element and a resilient conductive tip element; and electrical series circuitry formed from said body element through said lamp and said battery to said tip element, said series circuitry being completed to activate said lamp if a phono plug inserted into said jack has a short circuit between its tip contact and body contact.

* * * * *